(12) United States Patent
Shin et al.

(10) Patent No.: US 12,510,519 B2
(45) Date of Patent: Dec. 30, 2025

(54) LIQUID AUTO FRACTION APPARATUS FOR COLUMN CHROMATOGRAPHY

(71) Applicant: EXOPERT CORPORATION, Seoul (KR)

(72) Inventors: Hyunku Shin, Seoul (KR); On Shim, Seoul (KR)

(73) Assignee: EXOPERT CORPORATION, Seoul (KR)

( * ) Notice: Subject to any disclaimer, the term of this patent is extended or adjusted under 35 U.S.C. 154(b) by 165 days.

(21) Appl. No.: 18/013,249

(22) PCT Filed: Mar. 8, 2022

(86) PCT No.: PCT/KR2022/003256
§ 371 (c)(1),
(2) Date: Dec. 28, 2022

(87) PCT Pub. No.: WO2023/080351
PCT Pub. Date: May 11, 2023

(65) Prior Publication Data
US 2024/0102975 A1 Mar. 28, 2024

(30) Foreign Application Priority Data

Nov. 5, 2021 (KR) .......... 10-2021-0151495

(51) Int. Cl.
*G01N 30/38* (2006.01)
*G01F 22/00* (2006.01)
*G01N 30/02* (2006.01)

(52) U.S. Cl.
CPC .......... *G01N 30/38* (2013.01); *G01F 22/00* (2013.01); *G01N 2030/027* (2013.01)

(58) Field of Classification Search
CPC .......... G01F 22/00; G01N 2030/027; G01N 2035/1025; G01N 30/06; G01N 30/24;
(Continued)

(56) References Cited

U.S. PATENT DOCUMENTS 6,077,438 A    6/2000   Zambias et al.
7,689,137 B2 * 3/2010   Oda ............. G03G 15/104
                                                399/57
(Continued)

FOREIGN PATENT DOCUMENTS

CN    103134568 A    6/2013
CN    210612952 U    5/2020
(Continued)

*Primary Examiner* — Kristina M Deherrera
*Assistant Examiner* — Gedeon M Kidanu
(74) *Attorney, Agent, or Firm* — Revolution IP, PLLC

(57) ABSTRACT

A liquid auto fraction apparatus for column chromatography includes a microtube mounting portion in which a plurality of microtubes for accommodating liquids to be fractionated according to column chromatography are mounted, a liquid supply unit configured to sequentially supplying the liquids to the plurality of microtubes, a light source unit provided on a rear side of the plurality of microtubes to emit light, an image acquisition unit provided on a front side of the plurality of microtubes to acquire images of the plurality of microtubes at preset time intervals while column chromatography is performed, a volume determination unit configured to extract heights of water surfaces of the accommodated liquids by analyzing the images of the plurality of microtubes acquired by the image acquisition unit, and a control unit configured to set a reference value for determining whether the volumes reach the target volume.

12 Claims, 4 Drawing Sheets

(58) Field of Classification Search
CPC ........ G01N 30/38; G01N 30/74; G01N 30/80; G01N 35/1016
See application file for complete search history.

(56) References Cited

U.S. PATENT DOCUMENTS

| | | | | |
|---|---|---|---|---|
| 8,184,848 | B2* | 5/2012 | Wu | G06V 10/44 |
| | | | | 73/1.73 |
| 8,752,418 | B2* | 6/2014 | Frojdh | G01N 30/82 |
| | | | | 73/61.56 |
| 10,444,204 | B2* | 10/2019 | Iovanni | G01N 30/38 |
| 2009/0067669 | A1* | 3/2009 | Kojima | G01F 23/2928 |
| | | | | 382/100 |
| 2016/0146766 | A1* | 5/2016 | Leszczyszyn | F16B 7/0406 |
| | | | | 530/417 |

FOREIGN PATENT DOCUMENTS

| | | |
|---|---|---|
| GB | 1076473 A | 7/1967 |
| JP | 07-120292 A | 5/1995 |
| JP | 2001-041803 A | 2/2001 |
| JP | 2007-298445 A | 11/2007 |
| JP | 2010-175291 A | 8/2010 |
| KR | 10-1626460 B1 | 6/2016 |

* cited by examiner

LIQUID AUTO FRACTION APPARATUS FOR COLUMN CHROMATOGRAPHY

TECHNICAL FIELD

The present invention relates to a liquid auto fraction apparatus for column chromatography, and more particularly, to a liquid auto fraction apparatus for column chromatography that may acquire a desired amount of liquid fraction more conveniently and accurately through column chromatography.

BACKGROUND

Column chromatography is a type of size-exclusion chromatography for classifying substances mixed in a liquid mixture according to sizes of the substances. Specifically, when a stationary phase (for example, silica beads) is filled in a column and a mobile phase (for example, blood plasma, culture fluid of cell, or so on) passes through the column, substances in the mobile phase are sequentially discharged into different fractions according to sizes thereof. Through this, only particles of a desired size may be separated.

When fractions are obtained by using column chromatography as described above, a person visually checks whether the desired amount is fractionated in general. However, when the amount to be fractionated is small (for example, several µl), there is a high possibility of making a mistake, there is variation depending on persons who work, and there are limitations in that it is difficult to obtain a large amount of samples.

There is also a liquid auto fraction apparatus on the market, but the known device obtains fractions mainly based on the weight of a liquid, and thus, there is a limit to fractionate a small amount of liquid in units of ill due to a large error.

SUMMARY OF INVENTION

Technical Problem

According to the present invention, there is provided a liquid auto fraction apparatus for column chromatography that may more conveniently and accurately obtain a desired amount of liquid fraction through column chromatography.

Solution to Problem

According to an embodiment of the present invention to achieve the technical object, a liquid auto fraction apparatus for column chromatography includes a microtube mounting portion in which a plurality of microtubes for accommodating liquids to be fractionated according to column chromatography are mounted, a liquid supply unit configured to sequentially supplying the liquids to the plurality of microtubes, a light source unit provided on a rear side of the plurality of microtubes to emit light, an image acquisition unit provided on a front side of the plurality of microtubes to acquire images of the plurality of microtubes at preset time intervals while column chromatography is performed, a volume determination unit configured to extract heights of water surfaces of the accommodated liquids by analyzing the images of the plurality of microtubes acquired by the image acquisition unit and configured to determine whether volumes of the liquids accommodated in the plurality of microtube reach a target volume based on the extracted heights of the water surfaces, and a control unit configured to set a reference value for determining whether the volumes reach the target volume and configured to control operations of the liquid supply unit and the image acquisition unit according to a determination result of the volume determination unit.

The microtube mounting portion may be composed of a plurality of grooves formed in a housing to accommodate the plurality of microtubes, and the plurality of grooves may be arranged in a row at preset intervals on a straight line.

A reference microtube accommodating a liquid of the target volume may be mounted in a first groove among the plurality of grooves, and the plurality of microtubes for fractionation may be mounted in the other grooves.

The liquid supply unit may include a column including a stationary phase and a mobile phase, a column support coupled to the housing so as to be movable along a linear axis parallel to the straight line on which the plurality of grooves are formed and configured to support the column such that the column is sequentially movable at a position corresponding to the plurality of microtubes, and a drive unit coupled to a lower end of the column support and configured to move the column such that the column is located on an upper portion of one of the plurality of microtubes as column chromatography is performed.

The image acquisition unit may include a camera installed to be sequentially movable from the position corresponding to the plurality of microtubes and configured to acquire images of the plurality of microtubes, a movement shaft that is parallel to the straight line on which the plurality of grooves are formed and on which the camera moves, and a drive unit configured to move the camera on the movement shaft such that the camera is located in front of the plurality of microtubes as the column chromatography is performed.

The volume determination unit may analyze the images each of the plurality of microtubes obtained by the image acquisition unit at the preset time intervals and determine whether the volumes reach the target volume by using only an image with a standard deviation of the extracted height of the water surface that is less than or equal to a preset value.

The volume determination unit may find boundary surfaces of refracted images among the images of the plurality of microtubes, extract the heights of the water surfaces, and compare the heights of the water surfaces with the reference value to determine whether the volumes reach the target volume.

The volume determination unit may sum all R-channel values of pixels on respective horizontal lines in the image of each of the plurality of microtubes for each horizontal line and extract a position of the horizontal line in which the sum of the R-channel values is greatest as the height of the water surface, and determine that the volume reaches the target volume when the height of the water surface exceeds the reference value.

The liquid auto fraction apparatus may further include a display unit implemented as a touch screen to display buttons for receiving signals relating to operations of the liquid auto fraction apparatus, to visualize a performance state of the column chromatography as graphics, and to display the visualized performance state.

The control unit may acquire and analyze an image of the reference microtube to extract a height of a water surface and sets the extracted height as the reference value.

The control unit may check whether alignment of the plurality of microtubes and the light source unit is correct based on brightness of the images of the plurality of microtubes, and correct a position of the image acquisition unit when the alignment is not correct.

The control unit may sum R-channel values of respective pixels on a central vertical line in the image of each of the plurality of microtubes and determine that alignment of the plurality of microtubes and the light source unit is correct when the summed value is greater than or equal to a preset value.

Advantageous Effects

As described above, according to the present invention, it is possible to more accurately and conveniently perform column chromatography, which is performed manually in the prior art, through a mechanical device and volume determination through image analysis. In addition, in terms of performance, an accurate result corresponding to those skilled in column chromatography may be obtained. In addition, productivity and convenience may be ensured through automation to obtain an accurate fractionation of a desired sample more easily.

REFERENCE SIGNS LIST

Figure 1:
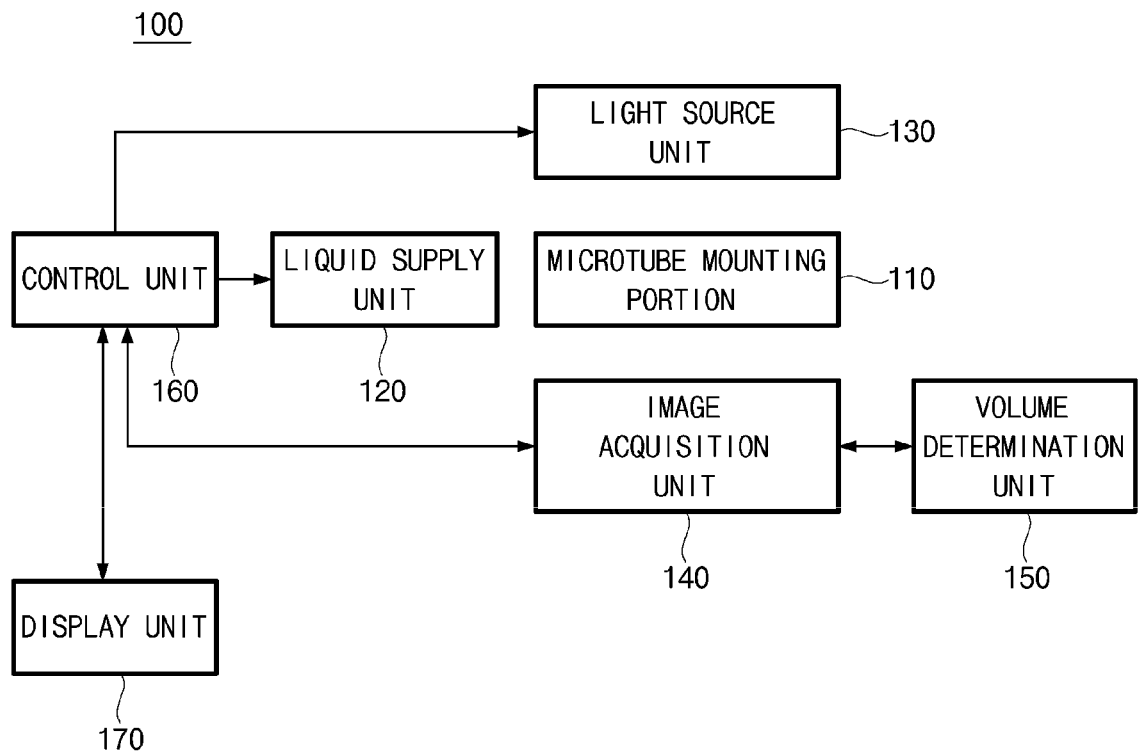
FIG. 1 is a configuration diagram of a liquid auto fraction apparatus for column chromatography, according to an embodiment of the present invention.

100: liquid auto fraction apparatus
110: microtube mounting portion
120: liquid supply unit
130: light source unit
140: image acquisition unit
150: volume determination unit
160: control unit
170: display unit

BEST MODE FOR INVENTION

Hereinafter, preferred embodiments according to the present invention will be described in detail with reference to the accompanying drawings. In this process, thicknesses of lines or sizes of components illustrated in the drawings may be enlarged for clarity and convenience of description.

In addition, terms to be described below are defined in consideration of functions in the present invention, which may change according to the intention or custom of a user or an operator. Therefore, definitions of the terms will have to be made based on the content throughout the present specification.

Figure 2:
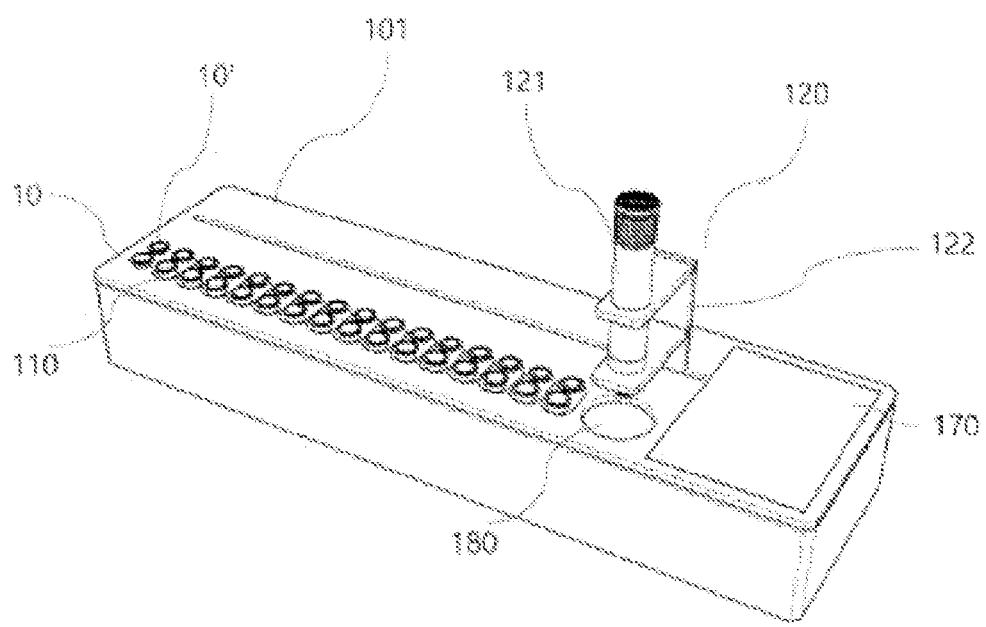
FIG. 2 is a view illustrating an implementation example of the liquid auto fraction apparatus for column chromatography illustrated in FIG. 1.
Figure 3:
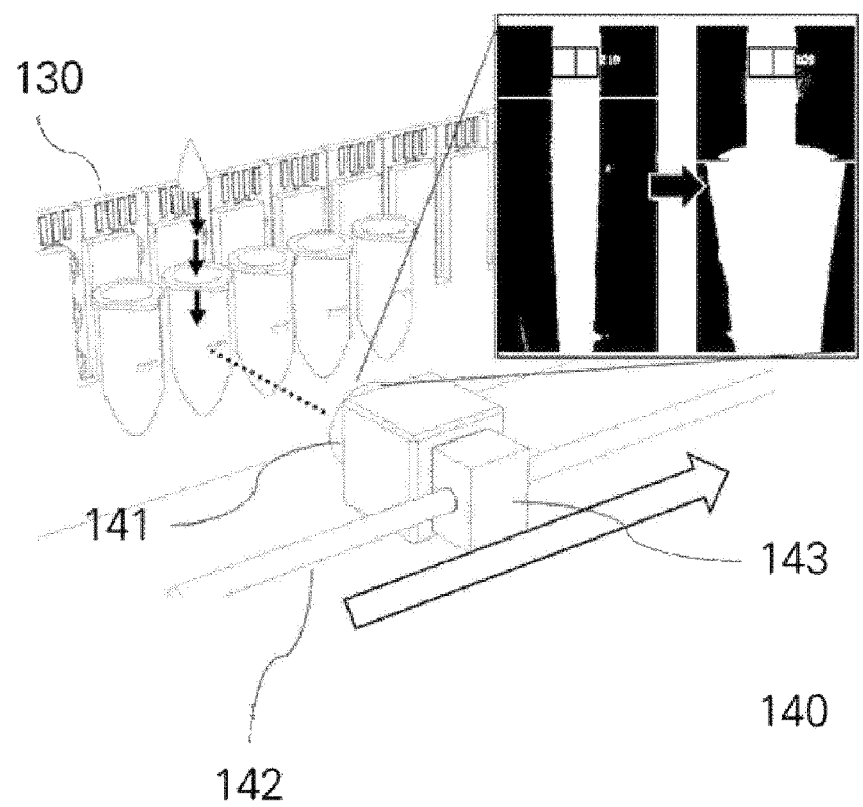
FIG. 3 is an operation schematic view of the liquid auto fraction apparatus for column chromatography illustrated in FIG. 2.

FIG. 1 is a configuration diagram of a liquid auto fraction apparatus for column chromatography, according to an embodiment of the present invention, FIG. 2 is a view illustrating an implementation example of the liquid auto fraction apparatus for column chromatography illustrated in FIG. 1, and FIG. 3 is an operation schematic view of the liquid auto fraction apparatus for column chromatography illustrated in FIG. 2.

Referring to FIGS. 1 to 3, a liquid auto fraction apparatus 100 for column chromatography, according to an embodiment of the present invention, may include a microtube mounting portion 110, a liquid supply unit 120, a light source unit 130, an image acquisition unit 140, a volume determination unit 150, a control unit 160, and a display unit 170.

The microtube mounting portion 110 is a portion on which a plurality of microtubes 10 accommodating liquid to be fractionated according to column chromatography are mounted.

According to one embodiment, the microtube mounting portion 110 may have a plurality of grooves formed in a housing 101 of a device to accommodate the plurality of microtubes 10 used in column chromatography, and the plurality of grooves may be linearly arranged in a line at preset intervals.

The liquid supply unit 120 performs column chromatography by sequentially supplying liquid to the plurality of microtubes 10 mounted on the microtube mounting portion 110.

According to one embodiment, the liquid supply unit 120 may be configured to include a column 121 accommodating a stationary phase and a mobile phase, a column support 122 supporting the column 121, and a drive unit (not illustrated) coupled to the column support 122 to move the column 121.

Specifically, as illustrated in FIG. 2, the column 121 may be supported by the column support 122 so as to be sequentially movable at positions respectively corresponding to the plurality of microtubes 10 mounted on the microtube mount 110. The column support 122 may be coupled to the housing 101 so as to be movable along a linear axis parallel to a straight line formed with a plurality of grooves constituting the microtube mounting portion 110. In addition, a drive unit (not illustrated) may be coupled to a lower end of the column support 122 inside the housing 101 to move the column 121 such that the column 121 supported by the column support 122 is on an upper portion of a corresponding microtube as the column chromatography is performed. A liquid, which is a mobile phase and stored in the column 121, falls down through an outlet formed at a lower portion of the column 121 as the column chromatography is performed to be accommodated in the microtube 10 located at the lower portion of the column 121.

The light source unit 130 may be provided on a rear side of the plurality of microtubes 10 mounted on the microtube mounting portion 110 inside the housing 101 to emit light and may be composed of, for example, a red light emitting diode (LED) light source, but is not limited thereto.

According to one embodiment, the light source unit 130 may be composed of a plurality of LED light sources as illustrated in FIG. 3 to be provided at positions respectively corresponding to the plurality of microtubes 10 mounted on the microtube mounting portion 110 and may be composed of a movable single LED light source to be provided at a rear side of a corresponding microtube in which column chromatography is performed.

The image acquisition unit 140 is provided on a front side of the plurality of microtubes 10 mounted on the microtube mounting portion 110 inside the housing 101 to acquire images of the plurality of microtubes 10 at preset time intervals while column chromatography is performed.

According to one embodiment, the image acquisition unit 140 may include a camera 141 for acquiring images of the plurality of microtubes 10, a movement shaft 142 on which the camera 141 moves, and a drive unit 143 that moves the camera 141 on the movement shaft 142.

Specifically, the camera 141 may be installed to be sequentially movable along the movement shaft 142 at positions respectively corresponding to the plurality of microtubes 10 mounted on the microtube mounting unit 110. Here, the movement shaft 142 may be parallel to a straight line formed with a plurality of grooves constituting the microtube mounting portion 110. In addition, the drive unit 143 may move the camera 141 such that the camera 141 is in front of a corresponding microtube as column chromatography is performed.

The volume determination unit 150 may analyze an image of each of the plurality of microtubes acquired by the image acquisition unit 140 to extract a height of a water surface of the accommodated liquid and may determine whether a volume of the liquid accommodated in the microtube reaches a target volume based on the extracted height of the water surface.

In the present invention, the height of the water surface may be extracted by using a phenomenon in which light emitted by the light source unit 130 passes through the microtube 10 and is refracted by the liquid accommodated in the microtube 10, and it is determined whether a volume of a liquid reaches the target volume based on the extracted height of the water surface. In other words, as the liquid fills the microtube 10, a refractive pattern of the light changes, and the change in refractive pattern is acquired as an image and analyzed to find a boundary surface of the refracted image and to extract a height of a water surface, and accordingly, it is possible to determine that a volume of a liquid reaches the target volume based on the extracted height of the water surface.

To this end, the volume determination unit 150 analyzes an image of each of the plurality of microtubes 10 acquired by the image acquisition unit 140 at preset time intervals. In this case, it may be difficult to accurately analyze an image of the microtube 10 acquired at the moment when water droplets fall into the microtube 10 or at the moment when the water droplets attach to an inner wall of the microtube 10, and accordingly, only stable images may be used for more accurate analysis. For example, assuming that a volume of one water droplet falling from the column 121 is approximately 20 μl and water droplets fall at intervals of approximately 1 second, the volume determination unit 150 may receive images of the plurality of microtubes 10 acquired by the image acquisition unit 140 at intervals of 0.1 second and analyze the images to extract heights of water surfaces and use only image with a standard deviation of the extracted height of the water surface that is less than or equal to a preset value.

A method of determining whether the volume determination unit 150 extracts a height of a water surface to determine whether a volume of a liquid reaches a target volume based on the extracted height is described below in detail with reference to FIG. 4.

The control unit 160 controls all operations of the respective components of the liquid auto fraction apparatus 100 for column chromatography illustrated in FIG. 1.

According to one embodiment, the control unit 160 may set a reference value for the volume determination unit 150 to determine whether a volume reaches a target volume and may control operations of the liquid supply unit 120 and image acquisition unit 140 according to a determination result of the volume determination unit 150.

Specifically, the control unit 160 may control the operation of the liquid auto fraction apparatus 100 for column chromatography according to the embodiment of the present invention as described below with reference to FIG. 4.

The display unit 170 may display information on the operation of the liquid auto fraction apparatus 100 for column chromatography and receive signals related to the operation of the device and may be implemented as, for example, a touch screen.

According to one embodiment, the display unit 170 may display a button for receiving a signal related to the operation of the device and may further visualize a performance state of column chromatography as graphics and display the visualized performance state.

Figure 4:
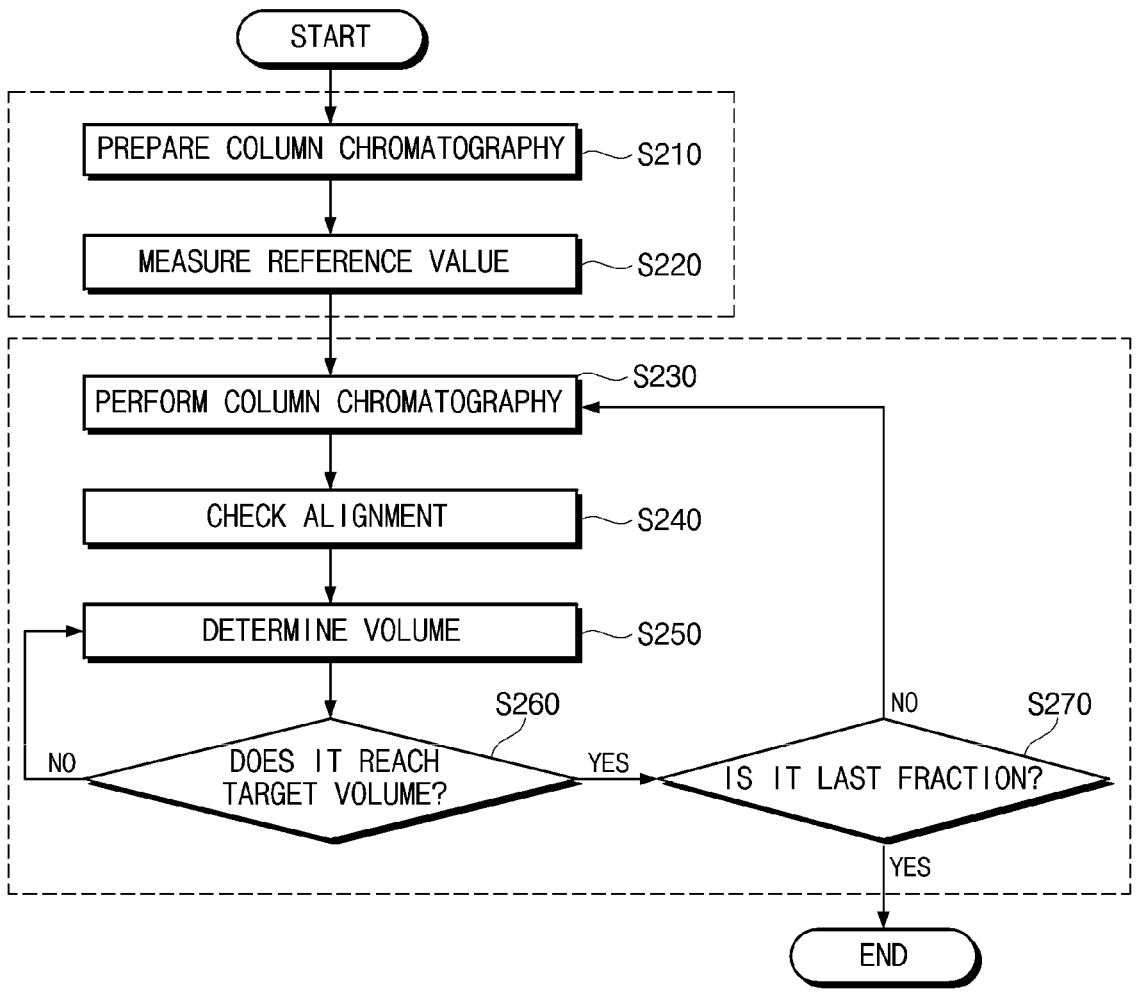
FIG. 4 is a flowchart illustrating an operating method of the liquid auto fraction apparatus for column chromatography illustrated in FIG. 1.
Figure 5:
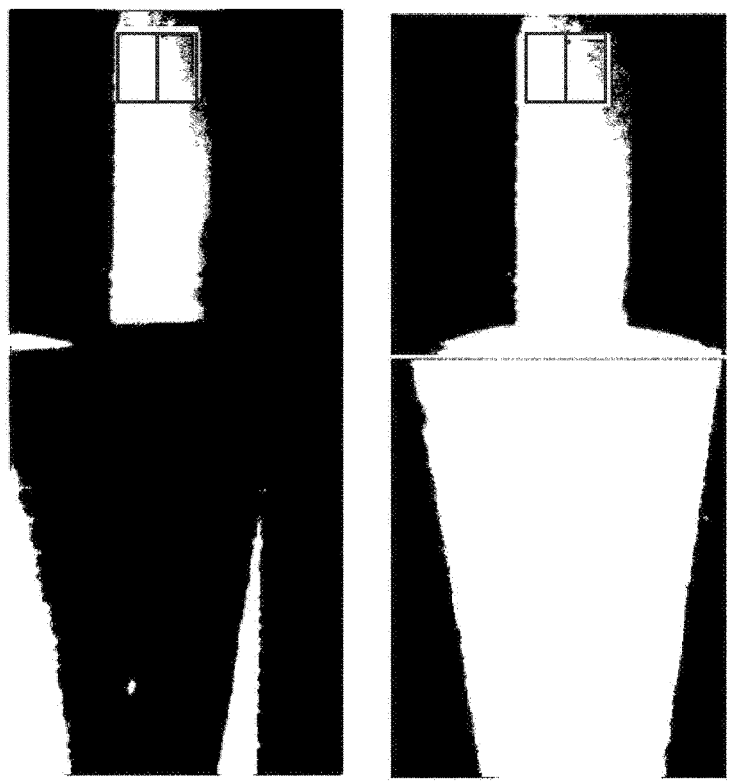
FIG. 5 is a view illustrating an acquired image according to an alignment state of a light source and a microtube, according to an embodiment of the present invention.
Figure 6:
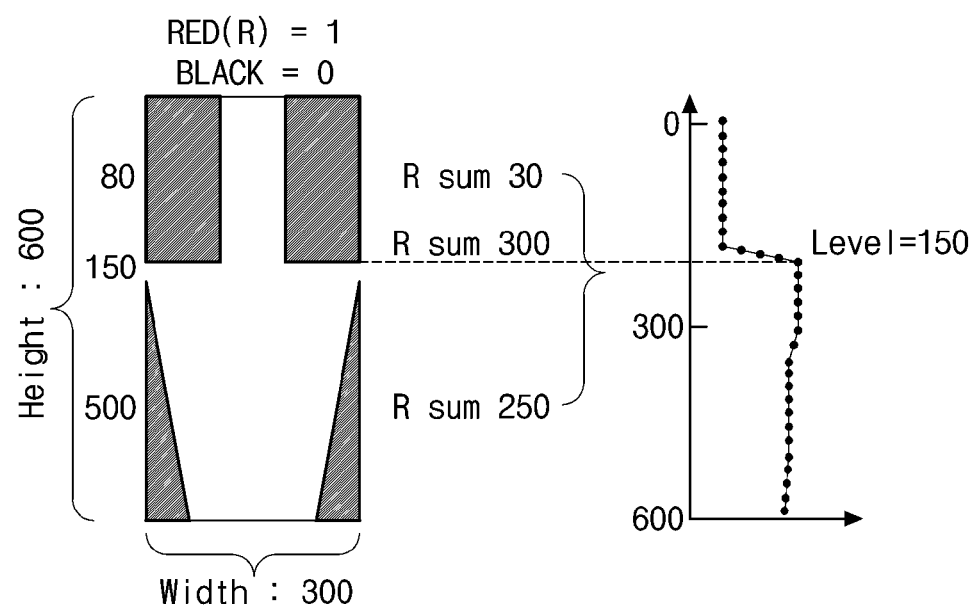
FIG. 6 is a diagram illustrating a method of extracting a height of a water surface through image analysis, according to an embodiment of the present invention.

FIG. 4 is a flowchart illustrating an operating method of the liquid auto fraction apparatus for column chromatography illustrated in FIG. 1, FIG. 5 is a view illustrating an acquired image according to an alignment state of a light source and a microtube, according to an embodiment of the present invention, and FIG. 6 is a diagram illustrating a method of extracting a height of a water surface through image analysis, according to an embodiment of the present invention.

Referring to FIG. 4, column chromatography is first prepared (S210). According to one embodiment, the column 121 that accommodates a stationary phase and a mobile phase for the column chromatography is mounted on the column support 122, and a plurality of empty microtubes for fractionation are mounted on the microtube mounting portion 110. In this case, the first groove among the plurality of grooves constituting the microtube mounting portion 110 is left without mounting the microtube for fractionation.

Then, a reference value of the fractions measured (S220). According to one embodiment, a reference microtube that accommodates a liquid (for example, water) of a target volume to be fractionated through the column chromatography is mounted in the first groove among the plurality of grooves constituting the microtube mounting portion 110, and when a "Ready" button displayed on the display unit 170 is touched, a height of a water surface is extracted by acquiring and analyzing an image of the reference microtube, and the extracted height of the water surface is set as the reference value (that is, a target value).

Thereafter, the column chromatography is performed (S230). According to one embodiment, when a "Start" button displayed on the display unit 170 is touched and a cover of the column 121 is removed, the column 121 moves to an upper portion of the next microtube, and the column chromatography is performed. In this case, the camera 141 (an LED light source as necessary) inside the housing 101 also moves to a position corresponding to the next microtube, and images of the microtubes are acquired at predetermined time intervals as the column chromatography is performed.

Then, alignment of the microtube and the LED light source is checked (S240). When a central alignment of the microtube and the LED light source is not correct, a liquid portion may be dark in the acquired image as illustrated in the image illustrated on the left side of FIG. 5. Therefore, according to one embodiment, whether the alignment of the microtube and the LED light source is correct is checked based on brightness of the acquired image, and when the alignment is not correct, the camera 141 may be moved to the left or right direction to correct a position of the camera 141 to adjust the alignment of the microtube and the LED light source. For example, when the light source unit 130 is composed of a red LED light source, an image of a liquid portion appears in red, and accordingly, when the sum of R-channel values of respective pixels on an extended line of a vertical line in the center of the acquired image illustrated in FIG. 5, that is, on an extended line of a vertical line in the center of a black square box displayed on an upper side of the image illustrated in FIG. 5 is greater than or equal to a preset value, it may be determined that the alignment of the micro tube and the LED light source is correct.

Then, a volume is determined through analysis of the image of the microtube (S250). According to one embodiment, the volume determination unit 150 may determine whether a volume of a liquid reaches a target volume by finding a boundary surface of a refracted image through image analysis, extracting a height of a water surface, and comparing the extracted height with the reference value. For example, illustrated in FIG. 6, the volume determination unit 150 may sum up all R-channel values of pixels on respective horizontal lines of the image for each horizontal line and extract a position (a value of the y axis of the graph) of a horizontal line corresponding to the greatest value of the summed R-channel values (values of the x axis of the graph) as the height of the water surface.

As a result of the determination, when the volume of the liquid reaches the target volume (S260), that is, when the extracted height of the water surface exceeds the reference value, S230 to S260 are repeated until the last fraction (that is, microtube) is reached (S270).

Although the present invention is described with reference to the embodiments illustrated in the drawings, this is only an example, and those skilled in the art will understand that various modifications and equivalent other embodiments are possible therefrom. Therefore, the true technical protection scope of the present invention should be determined by the technical idea of the claims below.

The invention claimed is:

1. A liquid auto fraction apparatus for column chromatography comprising:
    a microtube mounting portion in which a plurality of microtubes for accommodating liquids to be fractionated according to column chromatography are mounted;
    a liquid supply unit configured to sequentially supply the liquids to the plurality of microtubes;
    a light source unit provided on a rear side of the plurality of microtubes to emit light;
    an image acquisition unit provided on a front side of the plurality of microtubes to acquire images of the plurality of microtubes at preset time intervals while column chromatography is performed;
    a volume determination unit configured to,
        analyze images of the plurality of microtubes and extract heights of water surfaces by analyzing refractive patterns of light passing through the microtubes;
        determine whether volumes of the liquids reach a target volume by comparing the extracted heights with a reference value; and
    a control unit configured to set the reference value for determining whether the volumes reach the target volume and configured to control operations of the liquid supply unit and the image acquisition unit according to a determination result of the volume determination unit.

2. The liquid auto fraction apparatus of claim 1, wherein the microtube mounting portion is composed of a plurality of grooves formed in a housing to accommodate the plurality of microtubes, and
    the plurality of grooves are arranged in a row at preset intervals on a straight line.

3. The liquid auto fraction apparatus of claim 2, wherein a reference microtube accommodating a liquid of the target volume is mounted in a first groove among the plurality of grooves, and
    the plurality of microtubes for fractionation are mounted in the other grooves.

4. The liquid auto fraction apparatus of claim 3, wherein the control unit acquires and analyzes an image of the reference microtube to extract a height of a water surface and sets the extracted height as the reference value.

5. The liquid auto fraction apparatus of claim 2, wherein the liquid supply unit includes:
    a column including a stationary phase and a mobile phase;
    a column support coupled to the housing so as to be movable along a linear axis parallel to the straight line on which the plurality of grooves are formed and configured to support the column such that the column is sequentially movable at a position corresponding to the plurality of microtubes; and
    a drive unit coupled to a lower end of the column support and configured to move the column such that the column is located on an upper portion of one of the plurality of microtubes as column chromatography is performed.

6. The liquid auto fraction apparatus of claim 5, wherein the image acquisition unit includes:
    a camera installed to be sequentially movable from the position corresponding to the plurality of microtubes and configured to acquire images of the plurality of microtubes;
    a movement shaft that is parallel to the straight line on which the plurality of grooves are formed and on which the camera moves; and
    a drive unit configured to move the camera on the movement shaft such that the camera is located in front of the plurality of microtubes as the column chromatography is performed.

7. The liquid auto fraction apparatus of claim 1, wherein the volume determination unit analyzes the images each of the plurality of microtubes obtained by the image acquisition unit at the preset time intervals and determines whether the volumes reach the target volume by using only an image with a standard deviation of the extracted height of the water surface that is less than or equal to a preset value.

8. The liquid auto fraction apparatus of claim 1, wherein the volume determination unit is configured to:
    find boundary surfaces of refracted images among the images of the plurality of microtubes;
    extract the heights of the water surfaces based on the found boundary surfaces; and
    compare the heights of the water surfaces with the reference value to determine whether the volumes reach the target volume.

9. The liquid auto fraction apparatus of claim 8, wherein the volume determination unit sums all R-channel values of pixels on respective horizontal lines in the image of each of the plurality of microtubes for each horizontal line and extracts a position of the horizontal line in which the sum of the R-channel values is greatest as the height of the water surface, and determines that the volume reaches the target volume when the height of the water surface exceeds the reference value.

10. The liquid auto fraction apparatus of claim 1, further comprising:
a display unit implemented as a touch screen to display buttons for receiving signals relating to operations of the liquid auto fraction apparatus, to visualize a performance state of the column chromatography as graphics, and to display the visualized performance state.

11. The liquid auto fraction apparatus of claim 1, wherein the control unit checks whether alignment of the plurality of microtubes and the light source unit is correct based on brightness of the images of the plurality of microtubes, and corrects a position of the image acquisition unit when the alignment is not correct.

12. The liquid auto fraction apparatus of claim 11, wherein the control unit sums R-channel values of respective pixels on a central vertical line in the image of each of the plurality of microtubes, and determines that alignment of the plurality of microtubes and the light source unit is correct when the summed value is greater than or equal to a preset value.

* * * * *